A. SPEAR.
CASTELLATED NUT.
APPLICATION FILED FEB. 15, 1918.
1,283,346.
Patented Oct. 29, 1918.
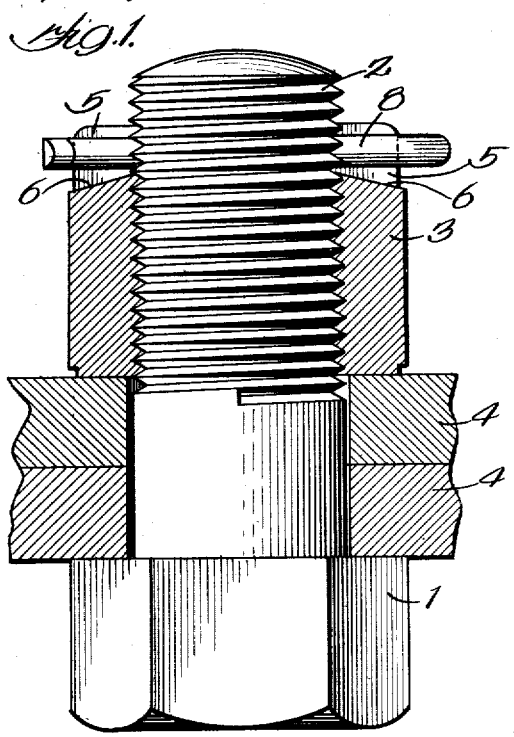
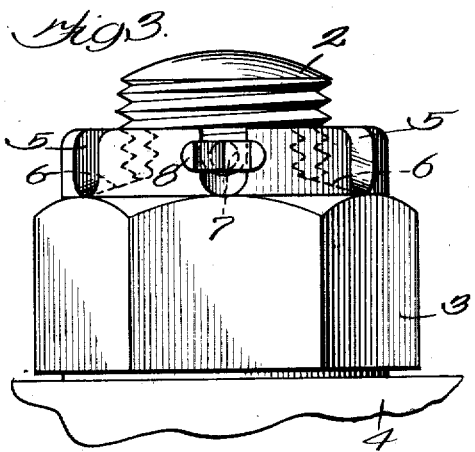
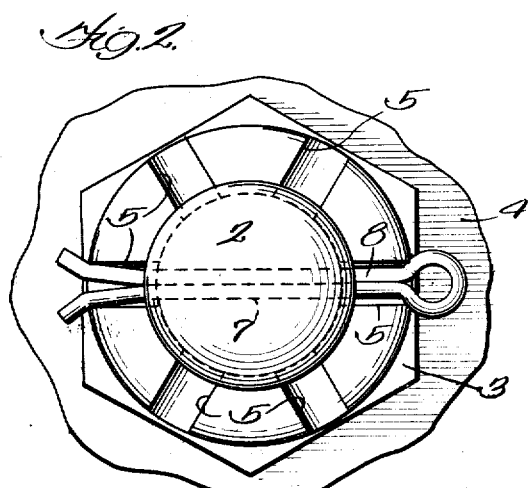
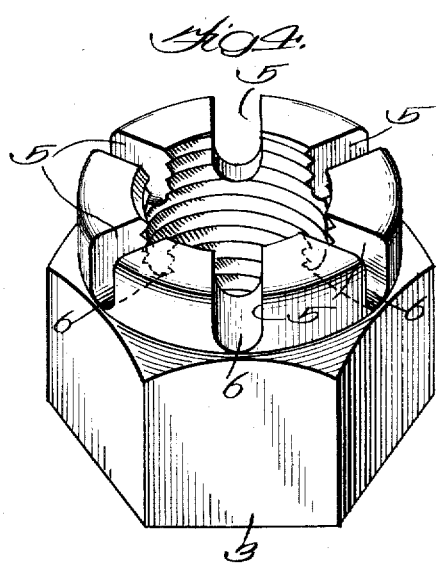
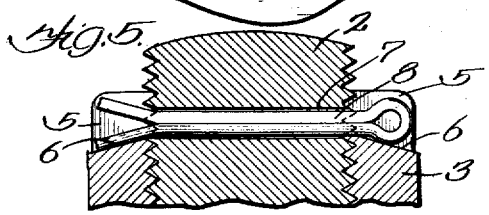
Inventor
Arthur Spear

UNITED STATES PATENT OFFICE.

ARTHUR SPEAR, OF CHICAGO, ILLINOIS, ASSIGNOR, BY MESNE ASSIGNMENTS, TO ARCHER MANUFACTURING COMPANY, OF CHICAGO, ILLINOIS, A CORPORATION OF ILLINOIS.

CASTELLATED NUT.

1,283,346.   Specification of Letters Patent.   Patented Oct. 29, 1918.

Application filed February 15, 1918. Serial No. 217,404.

*To all whom it may concern:*

Be it known that I, ARTHUR SPEAR, citizen of the United States, residing at Chicago, in the county of Cook and State of Illinois, have invented a certain new and useful Improvement in Castellated Nuts, of which the following is a full, clear, concise, and exact description.

My invention relates to castellating nuts and has for its object an improved formation of the radially disposed slots that are produced at ends of the nuts to castellate them. My invention resides in sloping the bottoms of these slots outwardly and toward the unslotted ends of the nuts whereby these slots may be of standard depth at the bores of the nuts and of greatest depth at the outside of the nuts. This formation of these slots makes the cotter pin receiving holes in the bolts upon which the castellated nuts are threaded more accessible to the cotter pins and also permits where it is desirable, the employment of cotter pins that do not project beyond the nuts inasmuch as the bifurcated tails of the cotter pins and the circular heads thereof may be disposed in the planes of the slots which taper sufficiently to accommodate the ends of the pins. These results are obtained without decreasing the extent of the threading of the bores of the nuts.

I will explain my invention more fully by reference to the accompanying drawing showing the preferred embodiment thereof and in which Figure 1 illustrates a nut in longitudinal section that is constructed in accordance with my invention, this nut being illustrated upon a bolt through which a cotter pin is passed that is received within diametrically alined slots in the nut that are made in accordance with the invention; Fig. 2 is a plan view of the parts shown in Fig. 1; Fig. 3 is a side elevation of the upper portion of the arrangement shown in Fig. 1; Fig. 4 is a perspective view of a nut constructed in accordance with the invention; and Fig. 5 shows an arrangement of a cotter pin differing from that illustrated in Figs. 1, 2 and 3.

Like parts are indicated by similar characters of reference throughout the different figures.

The bolt illustrated includes a head 1 and a threaded shank 2. The nut 3 of my invention has a threaded bore, the threads of which receive the threads upon the shank of the bolt. Objects 4 are illustrated as being clamped between the bolt head 1 and the nut 3. The nut is shown as having six radial slots 5 at its upper end, these slots extending clear from the bore of the nut to the exterior thereof. The bottoms 6 of these slots slope outwardly toward the lower or unslotted end of the nut whereby the slots are tapered, being deepest at their outer ends. When the nut has been screwed home or approximately home a pair of diametrically alined slots are brought into alinement with the hole 7 formed diametrically through the bolt shank 2 at the sloping bottoms of the slots whereafter the cotter pin may be readily passed through the hole 7 and the slots 5 in alinement therewith. The cotter pin 8 shown in Figs. 1, 2 and 3 has its head and bifurcated end disposed in a plane transverse to the plane that contains the alined slots receiving the pin and in this arrangement the ends of the pin project beyond the nut. Where it is not desirable to have the ends of the pin project beyond the nut a shorter pin is employed which is disposed in the plane of the alined slots 5 receiving the pin as illustrated in Fig. 5. The head of the pin is readily accommodated in one of these slots and the spread apart ends of the pin are readily accommodated in the other one of these slots due to the sloping formation of the bottoms of the slots.

Having thus described my invention I claim as new and desire to secure by Letters Patent the following:—

A castellated nut having radially disposed slots in one end whose bottoms slope outwardly toward the other end.

In witness whereof, I hereunto subscribe my name this twelfth day of February A. D. 1918.

ARTHUR SPEAR.